United States Patent Office 3,567,515
Patented Mar. 2, 1971

3,567,515
ELECTROCHEMICAL CELL CONTAINING SULFUR DIOXIDE AS THE CATHODE DEPOLARIZER
Donald Leonard Maricle, Ridgefield, and John Phillip Mohns, Stamford, Conn., assignors to American Cyanamid Company, Stamford, Conn.
No Drawing. Continuation of application Ser. No. 735,971, June 11, 1968, which is a continuation-in-part of application Ser. No. 678,476, Oct. 10, 1967, which is a continuation-in-part of application Ser. No. 589,237, Oct. 25, 1966, which in turn is a continuation-in-part of application Ser. No. 454,657, May 10, 1965. This application Mar. 25, 1970, Ser. No. 20,472
Int. Cl. H01m 17/00
U.S. Cl. 136—6
16 Claims

ABSTRACT OF THE DISCLOSURE

A primary and secondary electrochemical cell effective without electrode separator which comprises in combination an anode of a metal capable of reducing sulfur dioxide, a cathode particularly of a high surface area material, an electrolyte salt solution containing sulfur dioxide as the major cathode depolarizer, with the use of a co-solvent if desired.

---

This is a continuation of application Ser. No. 735,971, filed June 11, 1968, now abandoned, which was a continuation-in-part of application Ser. No. 678,476, filed Oct. 10, 1967, now abandoned, which was a continuation-in-part of application Ser. No. 589,237, filed Oct. 25, 1966, now abandoned, which was a continuation-in-part of application Ser. No. 454,657, filed May 10, 1965, now abandoned.

This invention relates to electrochemical cells and batteries. More particularly, this invention relates to non-aqueous primary and secondary electrochemical calls and batteries having a novel and improved cathode depolarizer which eliminates the need for chemical separation of the anode and the cathode depolarizer material.

Cathode depolarizers are conventionally employed in a form which will permit intimate and maximum contact with an external electrical conduit, such as the wires connecting the electrodes of a cell or battery, while also effecting separation of the cathode depolarizer from the anode. Thus, in practice, the cathode depolarizer is generally an insoluble, finely divided solid admixed with or plated over an inert conducting material such as nickel, graphite or carbon rod. The mechanical separation of the cathode depolarizer material from the anode is necessary to prevent the chemical reaction of cathode depolarizer with anode material which, in effect would discharge the battery internally without doing any useful work. For example, in the common Leclanche cell, the anode is zinc metal, the cathode is a porous carbon pencil, the cathode depolarizer is a mixture of manganese dioxide and acetylene carbon black, and the electrolyte is a mixture of ammonium chloride and zinc chloride gelled to a paste with corn starch and wheat flour. The cathode depolarizer mix is generally pressed around the carbon pencil which is centered in a cylindrical zinc anode casing and the electrolyte paste fills the cylindrical space between cathode depolarizer mix and outer zinc casing. Separation of cathode depolarizer and zinc anode is maintained by the essentially solid state of the cathode depolarizer mixture, by the electrolyte paste and by a separator of paper of similar material.

As examples of other cells requiring separation of anode and cathode depolarizer, may be mentioned the mercury dry cell (HgO cathode depolarizer with ZnO-saturated KOH electrolyte and cellulosic separator), alkaline manganese dry cell (zinc/KOH/$MnO_2$), zinc mercury-carbon cell (mercury dioxysulfate as cathode depolarizer with special gel-coated separator next to the surrounding zinc can), and alkaline silver-zinc dry cell (similar to mercury cell but with $Ag_2O$ or AgO instead of HgO). In each of such cells the cathode depolarizer material is a solid which is finely distributed in a matrix to obtain the greatest possible surface area for optimum electrical contact, conductivity and reduction. The solid state of this material also serves to separate the anode from the cathode mix so as to eliminate or substantially reduce interaction with the anode. Mechanical separation is conventionally further enhanced by employing the cathode depolarizer as a powder, compact, compartmentalized solution or suspension, plating or glossy metal oxide film, and by utilizing a separator material such as starch paste, fibrous material such as cotton, Dacron and nylon, alone or impregnated with resins, gels and the like.

Attempts have been made to modify such cells by the use of more active metals as anodes because of their higher potentials. However, in the case of active metals such as aluminum and magnesium, the electrolytes must be varied to control attack on these metals. In addition, there have been recent efforts to utilize organic materials as cathode depolarizers and also as cosolvents to reduce chemical reaction of anode and electrolyte. It will be evident that a cell which not only eliminates the need for chemical separation of anode and cathode depolarizer but also utilizes an active metal such as lithium, sodium, potassium, aluminum or magnesium as the anode without attack by cathode depolarizer or electrolyte, would provide high performance (watt-hours per pound) at minimum expense.

An object of the present invention is to provide a new and improved primary or secondary cell which avoids the need for chemical separation of cathode depolarizer and anode.

A further object of the present invention is to provide low cost primary and secondary cells and batteries producing higher watt-hours per pound when used with preferred active anode materials such as lithium and sodium.

These and other objects and advantages of the present invention will be apparent from the detailed exposition which follows.

It has now been discovered that the foregoing objects are achieved by an electrochemical cell which in its essential form comprises an anode of a metal capable of reducing sulfur dioxide, a cathode of a material substantially inert to sulfur dioxide but on which sulfur dioxide is reducible, said anode and cathode being immersed in a mixture of sulfur dioxide solution and an electrolyte salt substantially inert to sulfur dioxide and to the anode metal, wherein the sulfur dioxide solution is the major cathode depolarizer.

By "sulfur dioxide solution" is meant liquid sulfur dioxide (superatmospheric pressure or low temperature system) or a liquid cosolvent admixed with, e.g., substantially saturated by, gaseous sulfur dioxide at atmospheric pressure, or systems comprising mixtures of sulfur dioxide and cosolvent wherein the sulfur dioxide is substantially in excess, i.e., wherein the sulfur dioxide is the primary solvent, at superatmospheric pressure.

The anode is a metal or metallic material which is capable of reducing sulfur dioxide, i.e., the metal ion has less tendency than sulfur dioxide to accept electrons. Stated otherwise, the anode is any metal whose oxidized form is not reduced by the reduced form of sulfur dioxide or is a metal which exhibits a standard electrode potential (Gibbs-Stockholm electrode potential relative to the standard hydrogen electrode —SHE) greater, i.e., more reducing or less "noble," than that of sulfur dioxide. Particularly preferred is any metal which has a standard electrode potential of at least 0.2 volt more negative than that of sulfur dioxide in the non-aqueous systems herein described. Such standard electrode potentials conform to techniques of determination and sign convention having almost universal acceptance in the art as endorsed by the International Union of Pure and Applied Chemistry (1953) and as detailed in the Encyclopedia of Electrochemistry, Reinhold Publishing Company (1964), pp. 429–431.

Suitable metals are those substantially inert to sulfur dioxide, i.e., do not chemically react with sulfur dioxide beyond formation of a "passivating" film on the surface of the metal nor do they substantially physically react with sulfur dioxide during the useful life of the battery so as to be dissolved, disintegrated or dispersed. By a "passivating" film is meant some form of metal-sulfur dioxide complex or reaction product (not wholly identifiable) which prevents substantial further attack of sulfur dioxide on the metal anode and chemical or physical (except electrochemical) interaction of anode metal with the electrolyte solution.

This passivation is one of the unique advantages of the present invention since it permits elimination of the conventional separator or barrier between anode and cathode depolarizer which generally takes the form of a solid cathode depolarizer alone or in conjunction with an inert gelatinous or fibrous interface. In addition, the passivating film operates in a manner similar to a conventional semipermeable membrane since it remains porous to anodic ions and thus does not substantially impede the charge and discharge (electrochemical reduction and oxidation) of the anode metal.

Preferred anode metals are lithium, sodium, potassium and the alkaline earth metals such as beryllium, magnesium, calcium, strontium and barium. Of the foregoing, particularly preferred are lithium and sodium. Due to their activity and low equivalent weight, lithium and sodium provide the highest performance in watt-hours per pound weight of cell of all known materials. Moreover, these metals are substantially inert to sulfur dioxide and are passivated by sulfur dioxide as explained above. Less preferred metals are aluminum and transition metals having reduction potentials in a non-aqueous system more negative than sulfur dioxide such as zinc, tin, manganese, chromium, gallium, indium and the like. It will be appreciated that the foregoing metals may be employed alone, in mixtures or alloys of two or more, or in other forms such as powders and compacts alone or over a conducting or semi-conducting substrate.

Cathode design may be either of two types depending on the solubility of the sulfur dioxide reduction product formed during discharge of the cathode. As a general rule, insoluble products are obtained when alkali metal electrolytes are employed and soluble products when other than alkali metal ion electrolytes, such as tetraalkylammonium salts, are used.

When soluble products are obtained, the cathode material and its form are non-critical. The material may be any which serves as a conductor of electrons and which is substantially inert to sulfur dioxide but on which sulfur dioxide is reducible, i.e., which serves to transmit electrons to sulfur dioxide acting as an electron acceptor or oxidizing agent (in the sense of electron acceptor and not as donor of oxygen atoms to the cathode material by chemical reaction). By "substantially inert" is meant the substantial absence of chemical or physical (except electrochemical) interaction of the material with sulfur dioxide such as chemical oxidation, physical disintegration, dissolution, precipitation or coagulation during the useful life of the battery.

Preferred cathode materials for such soluble cathode product cells are metals of the platinum family including platinum, iridium, osmium, palladium, rhodium and ruthenium; carbon in any of its common electrode forms such as sintered, compacted or powdered graphite or carbon rod, alone or over platinum; iron in various forms, particularly as stainless steel; and nickel, silver, mercury, lead and gold. Less preferred materials are metals of the families of titanium, vanadium, chromium, manganese and iron (Groups IV–B, V–B, VI–B, VIII–B, and VIII of the Periodic Table); in alloys: copper, zinc, cadmium, germanium, tin, antimony and bismuth; certain nitrides such as boron nitride; and semi-conductors such as silicon-containing substances. These materials may take any of the many forms conventional in the art such as rods, compacts, powders, pastes, and the like.

When an insoluble sulfur dioxide reduction product is formed, it is observed that the precipitate deposits on the electrode surface and eventually blocks the cathode thereby preventing further sulfur dioxide reduction. Thus, under these conditions, high surface area cathode design is important in order to provide maximum capacity of the $SO_2$ cathode.

A high surface area cathode in combination with an alkali metal electrolyte offers other advantages over the soluble sulfur dioxide reduction product system. For example, the reduced product is held on the electrode surface where it can be reoxidized on the charge cycle without the mass transfer limitations associated with soluble reduced products. This facilitates the rapid and efficient recharging necessary for operation of the cells as secondary systems. In addition, the generation of an insoluble phase of constant activity during the discharge process produces an exceptionally flat discharge curve, that is, the decrease in voltage as the cell is discharged is very slight. Furthermore, the precipitate formed on the cathode during discharge removes from the electrolyte solution an amount of alkali metal ion equivalent to that released at the anode. Thus, the electrolyte concentration, and hence the conductivity of the solution, remains essentially constant during discharge and charge. This also eliminates the problem of precipitation of the electrolyte in the bulk of the solution as the cell is discharged.

It will be evident from the foregoing discussion that cathode materials may vary widely with choice being limited, in soluble cathode product systems, primarily only by the ability to conduct electrons and to transmit them to sulfur dioxide without substantially reacting with sulfur dioxide during the useful life of the battery, and in insoluble cathode product systems, additionally by the form of the cathode material, i.e., it must have high surface area.

To obtain these advantages, any of the aforementioned cathode materials may be employed provided they are in a form in which surface area is maximized, e.g., at least about 0.1 square meter per gram. Hence, powders, pastes, sintered materials, and the like, will be preferred over plates, disks, screens or expanded metal structures. Particularly preferred are carbon in its many high surface area forms, e.g., graphite, acetylene black, carbon black, and amorphous carbon; powdered platinum, aluminum and tantalum; and combinations of the foregoing, such as carbon paste over a screen of platinum, aluminum, or other conductor.

The preferred embodiment of the invention is, of course, a cell employing an alkali metal anode, an alkali metal electrolyte, particularly lithium or sodium, and a large surface area carbon cathode.

The electrolyte salts employed in the practice of the present invention are salts which dissolve and dissociate in the sulfur dioxide solution and which are substantially inert to interaction with the electrode materials and with sulfur dioxide, such as chemical oxidation by sulfur dioxide or coagulation or precipitation by sulfur dioxide. Such salts are employed singly or in mixtures of two or more and in amounts sufficient for dissociation in the sulfur dioxide solution and to provide a useful specific conductivity. Specific conductivity, since it is a function of temperature as well as relative proportions of salt and sulfur dioxide solution, may vary widely. Generally, however, the specific conductivity of the mixture of sulfur dioxide solution and electrolyte salt should be at least about $5 \times 10^{-5} \Omega^{-1}$ cm.$^{-1}$ at 22° C.

Electrolyte salts which are particularly preferred because of their exceptionally high conductivity, solubility in the sulfur dioxide solution and relative inertness to the electrode materials are lithium perchlorate and lithium halides, particularly lithium bromide. These electrode materials have been found to be particularly useful for reversible cells.

Also satisfactory as electrolyte materials are lithium salts of organic acids such as trichloroacetic, trifluoroacetic, boric, formic, paratoluene sulfonic acids, and lithium tetrafluoroborates, hexafluoroarsenates, hexafluorophosphates, hexafluorosilicates, monofluoroacetates, chloroaluminates and bromoaluminates.

Electrolyte salts having cations other than alkali metals are operable, but are less preferred, particularly for secondary cells, since they produce soluble sulfur dioxide reduction products. Such salts are for example tetraalkylammonium, particularly tetra(loweralkyl)ammonium, salts of halogens such as chlorine, fluorine, and bromine; tetraalkylammonium salts of organic acids such as trichloroacetic, trifluoroacetic, benzoic, formic, paratoluene sulfonic acid, and the like; and the tetraalkylammonium tetrafluoroborates, hexafluoroarsenates, hexafluorophosphates, hexafluorosilicates, monofluoroacetates, chloroaluminates, bromoaluminates, and perchlorates. Nonlimiting examples of such salts are tetraethylammonium chloride, tetraethylammonium acetate, tetrapropylammonium, tetrafluoroborate, tetrapropylammonium hexafluorosilicate and tetraethylammonium tetrachloroaluminate.

In addition, tetraalkylammonium and metal salts of organic acids, such as oleic oxalic, palmitic, propionic, stearic, succinic, valeric, cinnamic; other metal halides; metal cyanates and thiocyanates; metal sulfites and sulfamates; and metal nitrates, dicyanamides and tricyanomethides are suitable. The metal cation in the foregoing salts will preferably be an alkali or alkaline earth metal, provided the cathode has a large surface area. Also included but less preferred are sulfonium, arsonium and phosphonium salts such as trimethyl, triethyl and tripropyl sulfonium halides, acetates and the like.

As already mentioned, when at atmospheric pressure system is desired, a cosolvent is used with gaseous sulfur dioxide to promote solubility and conductivity of the electrolyte salts. Generally, the consolvent is substantially saturated with the gaseous sulfur dioxide. Such cosolvents must be stable to the sulfur dioxide and the other components of the system such as the electrolyte salts and electrode materials.

Generally, solvents which satisfy these requirements are liquid organic and inorganic compounds which have electron rich centers, i.e., contain one or more atoms having at least one unshared pair of electrons, and which lack acidic hydrogen atoms. Such electron rich compounds are materials which contain atoms of elements of Groups III–A, IV–A, V–A and VI–A of the Periodic Table [Handbook of Chemistry and Physics, 44th ed. (1963), pp. 448–449] as, for example, boron, silicon, nitrogen, phosphorus, oxygen and sulfur as well as combinations of these elements. Organic solvent molecules which are difunctional in these elements, i.e., contain two or more of the foregoing elements whether identical or different, are particularly suitable. By "acidic hydrogen atoms" is meant hydrogen atoms directly bonded to atoms of elements, except carbon, of the foregoing Periodic Groups. Thus, examples of excluded radicals would be OH, SH, PH and NH. Hence, piperidine would be excluded but N-methylpiperidine would be included as operable. Solvents which are strongly basic are not desirable.

The following classes of compounds exemplify organic cosolvents. These examples are, of course, nonlimiting since it will be immediately obvious that other solvents of these classes are substantially equivalent although some will be preferred over others due to a greater degree of solubility, etc. Mixtures of two or more of these solvents may likewise be employed.

Trialkyl borates: trimethyl borate, triethyl borate $(C_2H_5O)_3B$, etc.;
Boronic acid esters: dimethyl boronate

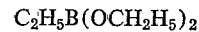

etc.;
Borinic acid esters: methyldiethyl borinate

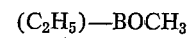

etc.;
Tetraalkyl silicates: tetramethyl silicate ($CH_3O)_4Si$, etc.;
Alkylalkoxyl silanes: methyltrimethoxy silane $CH_3Si(OCH_3)_3$ etc.;
Nitro alkanes: nitromethane, nitroethane, etc.;
Alkylnitriles: acetonitrile, propionitrile, isobutylronitrile, pivalonitrile, etc.;
Dialkyl amides: dimethylformamide $(CH_3)_2NCHO$, diethylformamide, etc.;
Lactams: N-methylpyrrolidinone also described as N-methyl-ν-butyrolactam, N-methyl-β-propiolactam, N-methyl-α-valerolactam, etc.;
Tetraalkyl ureas: tetramethylurea $(CH_3)_2NCON(CH_3)_2$ etc.;
Acetals: dimethylacetal $CH_3CH(OCH_3)_2$, etc.;
Ketals: 2,2-dimethoxypropane $(CH_3O)_2C(CH_3)_2$, etc.;
Monocarboxylic acid esters: ethylacetate, ethylbutyrate, etc.;
Orthoesters: trimethylorthoformate $HC(OCH_3)$, triethylorthoacetate $CH_3C(OC_2H_5)_3$, etc.;
Lactones: ν-butyrolactone, ν-valerolactone, etc.;
Dialkyl carbonates: dimethyl carbonate, diethyl carbonate, etc.;
Alkylene carbonates: ethylene carbonate, propylene carbonate, etc.;
Orthocarbonates: tetramethyl orthocarbonate, etc.;
Monoethers: dimethyl ether, diethyl ether, diisopropyl ether, n-butylether, the aliphatic monoethers disclosed as solvents in U.S. Pats. 2,019,832 and 2,171,867, etc.;
Polyethers: ethylene glycol diethyl ether, diethylene glycol diethyl ether, dimethoxytetraethyleneglycol, 1,2-dimethoxyethane (glyme), the aliphatic polyethers disclosed as solvents in U.S. Pats. 2,023,793 and 2,171,867, etc.;
Cyclic ethers: tetrahydrofuran, 1,4-dioxane, tetrahydropyran, etc.;
Monocarboxylic acid anhydrides: acetic anhydride, propionic anhydride, etc.;
Dialkyl sulfates: dimethylsulfate, etc.;
Dialkyl sulfites: dimethylsulfite, etc.;
Alkylene sulfites: ethylene sulfite, propylene sulfite, etc.;
Dialkyl sulfinites: dimethylsulfite, etc.;
Alkyl sulfonates: methylethyl sulfonate $C_2H_5SO_2OCH_3$ etc.;
Nonlimiting examples of inorganic cosolvents are phosphorus oxychloride, thionyl chloride and sulfuryl chloride. Other such solvents are described in Audrieth and Kleinberg, Non-aqueous Solvents (1953), particularly at p. 234, said text being incorporated herein by reference.

The relative proportions of sulfur dioxide, electrolyte salt and cosolvent are a matter of choice depending on the solubility of the components in each other at a given temperature and pressure. Preferably, sufficient amounts of sulfur dioxide are employed to substantially saturate the cosolvent and to provide the maximum amount of cathode depolarizer (sulfur dioxide). The relative and total amounts of sulfur dioxide, cosolvent and electrolyte salt will be such as to substantially dissolve the electrolyte salt and to achieve substantial mutual solubility as well as to provide a useful specific conductivity. From about 0.01 to 5.0, preferably 0.1 to 2.0, molar solution of the electrolyte relative to the cosolvent will generally contribute to the requisite solubility and conductivity in combination with the sulfur dioxide. But obviously the concentration may be varied substantially according to the conductivities desired since specific conductivity is a function of temperature as well as concentration of materials in the solvent-electrolyte system.

When a cosolvent is employed, as in a room temperature-atmospheric pressure system, the cosolvent may be first saturated with the gaseous sulfur dioxide and the electrolyte salt added, or the salt may be dissolved in the cosolvent and sulfur dioxide bubbled through the mixture. Complete saturation with sulfur dioxide is not critical since for a given electrolyte and cosolvent, concentrations of sulfur dioxide substantially less than saturation values at various temperatures and pressure contribute to a useful specific conductivity and cathode current density. Alternatively, systems containing amounts of sulfur dioxide greater than that required for saturation at atmospheric pressure may also be employed although such systems must be maintained at super-atmospheric pressure. In general, amounts of sulfur dioxide from about 0.2 molar to 22 molar, relative to the cosolvent, at a given temperature and pressure will be useful.

Alternatively, the use of a cosolvent may be avoided by employing liquid sulfur dioxide under the requisite superatmospheric pressure or at a liquefying temperature and atmospheric pressure. Such a system is advantageous due to the greater proportion of sulfur dioxide utilized per unit volume and weight of cell and more intimate contact of the sulfur dioxide with the cathode. Substantially the same relative and total amounts of liquid sulfur dioxide and electrolyte salt will be employed as described above with reference to the atmospheric pressure-dissolved sulfur dioxide system. If desired, a cosolvent may also be employed in this system to aid conductivity and dissolution of electrolyte salt but such, of course, is not required.

In the construction of cells or batteries of the invention, a large variety of cell enclosure materials is available, including inert materials such as glass, high density polyethylenes, polypropylenes, polytetrafluoroethylenes or the like. The cell is generally constructed so as to permit maintaining an inert atmosphere within the cell closure while excluding atmospheric moisture, nitrogen and oxygen. Inert gases such as argon, xenon and helium may be used for this purpose. Conventional means are provided for the addition and exit of the desired gases and for the insertion of the electrodes. The electrodes are constructed of the conductive materials noted above. In a typical embodiment, the anode is inserted as a coil, plate or sheet of metal or it may be a bed of a saturated metal amalgam. When a superatmospheric pressure system is desired, the enclosure, of course, will be maintained pressure-tight at the required liquefying pressure for sulfur dioxide.

Other aspects of cell construction such as the geometry of arrangement of electrodes within the cell closure and size of electrodes are routine considerations and form no part of the present invention.

The cells or batteries of the invention may also be constructed as so-called "reserve" cells or batteries. These are power supplies which are manufactured and then stored in a form that insures inertness until a specific action is taken by the user or that results automatically from the application. In a simple form, the electrolyte may be separated from the sulfur dioxide and battery plates and later added when activation is desired. Activation of such reserve cells or batteries may be effected in other known ways. For example, activation may be manual as by simple immersion of the electrodes in the sulfur dioxide-electrolyte mixture or by hypodermic filling of a cell or battery with sulfur dioxide and/or electrolyte. Activation may be provided automatically as well, as from a condition of use, e.g., from the linear acceleration resulting from missile launching or gun firing of a projectile which provides the energy to break an electrolyte ample. The nature of reserve battery systems as well as descriptions of particular forms of such systems are described, for example, in the Encyclopedia of Electrochemistry, C. A. Hampel, editor, Reinhold Publishing Corporation (1964), pp. 76–81. This publication is incorporated herein by reference. Many other variations of cell or battery design will at once become obvious to those skilled in the art in view of the present disclosure and the invention is not, of course, limited to any one design.

In summary, cells of the instant invention provide numerous advantages over conventional cells and include the following: (1) The sulfur dioxide acts as the electron acceptor at the cathode and thereby eliminates the need for conventional cathode depolarizing materials such as the metal oxides. (2) Since sulfur dioxide is inert to many anode metals, particularly lithium and sodium no chemical separation of the sulfur dioxide and anode metal need be maintained. When, however, cells of close tolerances are constructed, it may be desired to include a mechanical separator in order to prevent physical contact of the electrodes. (3) The inertness of sulfur dioxide to low equivalent weight active metals, such as lithium and sodium, permits use of these metals as anodes thereby substantially improving the watt-hours per pound performance of such cells. (4) When liquid sulfur diovide is employed, no other solvent is necessary for use with the electrolyte salts although inert cosolvents are useful to lower cell pressures and to improve electrolyte salt solubility and conductivity. (5) The sulfur dioxide also acts as a solvent for the electrolyte salt and is therefore present in sufficient amounts to substantially decrease concentration polarization. (6) The low equivalent weight of sulfur dioxide promotes higher watt-hours per pound performance. (7) The preferred embodiment of the invention, alkali metal electrolyte with large surface area cathode, provides an exceptionally flat discharge curve. The foregoing advantages substantially reduce the cost of the cell while improving cell performance and therefore provide substantial benefits to the art.

The effective utilization of sulfur dioxide in the present invention is a surprising result since little or substantially no reduction of sulfur dioxide occurs in the presence of an active metal such as lithium. However, if the electrons donated by the active metal (anode) are passed by an electrical connection to an electron conductor material (cathode), sulfur dioxide in the presence of the latter electrode is reduced. The precise reasons for this behavior are not wholly understood but it is believed (in the case of a lithium anode) that the anode is passivated by the formation of a thin film of lithium dithionite ($Li_2S_2O_4$) which then prevents further sulfur dioxide molecules from reaching the lithium anode surface but still permits electrochemical oxidation and reduction of the lithium anode. At the same time sulfur dioxide reduction products produced at the cathode react with lithium ion (when a lithium salt is employed as electrolyte) to precipitate lithium dithionite, thus preventing the buildup of lithium ion in solution.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

Suitable cells are constructed in conventional fashion using a cylindrical glass vessel closed with a rubber stopper through which are sealed connectors for the anode and cathode and means for admitting sulfur dioxide and inert gas. The clean, dry cell is placed in an argon-filled dry box where the electrodes are prepared and the dried electrolyte added to the cell. The cosolvent, if employed, is then introduced into the cell. The cell is thereafter removed from the dry box and sulfur dioxide gas is passed through the solution until the desired amount has collected in the cell. The performance of the cell is tested by connecting a voltmeter to the output terminals and an ammeter and variable load resistor in series with the cell.

A cell is prepared substantially as described, employing 0.5 molar tetrabutylammonium perchlorate in propylene carbonate, said solution being saturated with sulfur dioxide, together with a 2.15 cm.$^2$ lithium ribbon anode and a 1 cm.$^2$ platinized platinum cathode. This cell exhibits an open circuit voltage (hereinafter called OCV) of 2.9 volts and delivers 10 ma./cm.$^2$ (cathode current density, hereinafter called CCD) at 1.6 volts.

EXAMPLE 2

A cell is constructed substantially identical to that described in Example 1 except that the electrolyte is 1.0 molar tetramethylammonium bromide in propylene carbonate, saturated with sulfur dioxide and the cathode is a ⅛ inch diameter x ⅞ inch long carbon rod. This cell yields an OCV of 2.7 volts and passes 13.8 ma./cm.$^2$ CCD at 1.8 volts.

EXAMPLE 3

A cell substantially identical to that of Example 1 is constructed except that the electrolyte is 0.5 molar tetrabutylammonium bromide in dimethylsulfite, saturated with sulfur dioxide, and the anode and cathode are, respectively, a 4 cm.$^2$ lithium ribbon and a porous carbon cylinder of 1.5 cm. diameter and 3 cm. length. This cell exhibits an OCV of 2.7 volts and passes 5 ma./cm.$^2$ (anodic current density, hereinafter called ACD) at 1.5 volts.

EXAMPLE 4

A cell is constructed substantially as described in Example 1 but employing as electrolyte 1.0 molar tetramethylammonium bromide in dimethylsulfite, saturated with sulfur dioxide, and a 4 cm.$^2$ lithium ribbon and two 2 x 2 cm. porous nickel plaques as anode and cathode, respectively. The cell yields an OCV of 2.6 volts and passes 10 ma./cm.$^2$ ACD at 2.2 volts and 22 ma./cm.$^2$ ACD at 1.7 volts.

EXAMPLE 5

In a cell substantially identical to that of Example 4, except that a 4.4 cm.$^2$ 20 mesh nickel screen is employed as the cathode, an OCV of 2.8 volts is exhibited and ACD measurements are 10 ma./cm.$^2$ at 2.3 volts, 20 ma./cm.$^2$ at 2.0 volts and 30 ma./cm.$^2$ at 1.6 volts.

EXAMPLE 6

To a cell constructed from Pyrex glass pipe so as to withstand superatmospheric pressure, but otherwise substantially as described in Example 1, is added a 1 cm.$^2$ platinized platinum cathode, a 1 x 2 x 0.5 cm. lithium anode and tetramethylammonium bromide electrolyte. No cosolvent is employed. The cell is evacuated and cooled in a Dry Ice bath and then sufficient sulfur dioxide is condensed into the cell to make a 1.0 molar solution of the electrolyte in the liquid sulfur dioxide. After warming the cell to room temperature and pressure increases to about 38 lbs./sq. in. and the cell exhibits an OCV of 2.6 volts and passes 10 ma./cm.$^2$ at 2.15 volts and 100 ma./cm.$^2$ at 1.7 volts.

EXAMPLES 7–10

Table I below summarized results in the operation of cells constructed substantially in the same manner as Example 1 but with the solvent, electrolyte and electrodes as described. Although the alkali metal salt electrolytes of such systems normally would tend to shorten the useful life of the cell during current drain due to deposition of a current-blocking layer of alkali metal dithionite on the cathode, the systems described below are made useful by employing a cathode of large surface area.

TABLE I

| Ex. | Solvent | Electrolyte | Anode | Cathode | OCV, volts | ACD, ma./cm.$^2$ | CCD, ma./cm.$^2$ |
|---|---|---|---|---|---|---|---|
| 7 | Propylene carbonate saturated with SO$_2$ | 1.0 M LiClO$_4$ | 2.5 cm.$^2$ Li ribbon | (1) | 2.7 | (2) | |
| 8 | do | 1.0 M LiClO$_4$ | do | 1 cm.$^2$ Pt black | 2.9 | | (3) |
| 9 | do | 1.0 M LiClO$_4$ | do | (4) | 3.3 | | (5) |
| 10 | do | 1.0 M KI | do | 1.7 cm.$^2$ graphite rod | 3.1 | (6) | |

[1] 1 x 2.5 cm. porous carbon cylinder.
[2] 5 at 2.2 volts.
[3] 10 at 1.0 volt.
[4] 0.5 cm.$^2$ graphite paste disc.
[5] 10 at 1.9 volts.
[6] Rapid decay of current density. Remedied by cathode of greater surface area.

EXAMPLE 11

A cell substantially identical to that of Example 1 is constructed except that the anode is a 1 cm.$^2$ sodium ribbon and the cathode is a 1 cm.$^2$ nickel gauze. This cell provides an OCV of 2.3 volts and passes 3 ma./cm.$^2$ ACD at 1.1 volts.

EXAMPLE 12

In a cell substantially as described in Example 1 but employing 0.1 molar tetrabutylammonium perchlorate in propylene carbonate, saturated with sulfur dioxide, and as anode and cathode, ⅛ inch by 5 inch magnesium ribbon and 1 cm.$^2$ nickel screen, respectively, the OCV is 0.3 volt. Although the ACD measures less than about 1 ma./cm.$^2$ with decreasing voltage, the cell is useful as a light weight low current voltage source not requiring electrode separator or additional cathode depolarizer.

EXAMPLE 13

This example demonstrates the reversibility of a particular system. Many of the other cells of the invention also exhibit reversibility, particularly where an alkali metal electrolyte is employed.

A cell substantially the same as that of Example 7, except for a solvent system of acetonitrile saturated with sulfur dioxide and a cathode of a 0.7 gram carbon block of 1 cubic centimeter volume, discharged in 1.4×10$_3$ seconds at 2.0 to 1.0 volts, exhibiting an OCV of 3.1 volts, and was charged for the same length of time at 3.5 to 5.2 volts to 100% of original capacity. In the second cycle, the cell was recharged to 80% of original capacity, and in a subsequent series of five cycles, to 40% of original capacity, the time of discharge and charge being the same in each instance.

EXAMPLES 14–15

In these examples, a cell constructed substantially according to Example 1 was used, in which the electrolyte was lithium bromide, the anode was lithium sheet. The cathodes were high surface area porous carbon structure supported by 6 Al 7-1/0 Exmet (aluminum) screen. Cathode dimensions were 3 x 2 cm. The electrolyte was lithium bromide.

The performance of the cells is shown in Table II.

It is understood that although all of the cells and batteries of the invention as described and as illustrated by the foregoing examples are effective for various applications without electrode separator materials and cathode depolarizer other than sulfur dioxide, the invention also

TABLE II

| Example | Current Density, ma./cm.$^2$ | Discharge Polarization | Capacity of Initial Discharge to +1.0 v. | Capacity of Following Discharges (2nd Discharge) | Recharge Efficiency (1st Recharge) |
|---|---|---|---|---|---|
| 14 | 1.7 | +2.72 v. to +2.52 v. in 9.1 hours. | 4,858 coulombs/gm.-mix<br>3,255 coulombs/gm.-total wt. | 4,777 coulombs/gm.-mix<br>3,201 coulombs/gm.-total wt. | Range: +3.53 to +3.63 v.<br>Efficiency: 98.3%. |
| 15 | 1.7 | +2.7 v. to +2.5 v. in 11.4 hours. | 5,971 coulombs/gm.-mix<br>4,038 coulombs/gm.-total wt. | (2nd Discharge)<br>Capacity identical to initial discharge. | (1st Recharge)<br>Range: +3.55 to +3.6 v.<br>Efficiency: 100.0%. |

EXAMPLE 16

In this example, a cell having a spiral electrode configuration and LiBr electrolyte was employed.

The cathode was constructed by applying an aqueous paste of a carbon material in an inert binder to aluminum Exmet (6 Al 7-1/0). The anode was formed by cold pressing within a polyethylene envelope two lithium strips onto steel Exmet (5 FE 7-1/0). The cathode and two perforated polyethylene spacer sheets were placed in a Dacron envelope. The electrode "sandwich" was rolled with the anode on the inside and fitted tightly into a glass cylinder. The electrolytic solution of 1/1 acetonitrile/propylene carbonate. $SO_2$ and 1M LiBr was added to a level just below the top of the electrodes. The cell was then pressurized with $SO_2$ which raised the solution level over the electrodes. Initially this battery had a resistance of 1.87 ohms.

ELECTRODE SPECIFICATIONS

Cathode:
- Percent carbon—91.5%
- Percent binder—7.5%
- Weight Al Exmet and mix—2.55 gms.
- Weight mix on Exmet—2.00 gms.
- Dimensions—15 x 5.2 cm.

Anode:
- Weight lithium and Exmet—3.81 gms.
- Weight lithium on Exmet—2.31 gms. or 332.8 meq.
- Dimensions—15 x 5 cm.
- Pressed—1800 lbs.

OPERATION.—CURRENT DENSITY OF CHARGE AND DISCHARGE WAS 1.3 ma./cm.$^2$ (200 ma.). INITIAL OPERATION WAS DISCHARGE

| | Discharge, 2.65 v. to 2.0 v. | | Recharge, 3.4 v. to 3.75 v. | |
|---|---|---|---|---|
| Cycle: | Hours | Milli-equivalents | Milli-equivalents | Efficiency of charge |
| 1 | 13.9 | 100.08 | 100.08 | 34 |
| 2 | 4.75 | 34.20 | 34.20 | 85 |
| 3 | 4.03 | 29.02 | 29.02 | 92 |
| 4 | 3.70 | 26.64 | 86.04 | [1]78 |
| 5 | 9.35 | 67.32 | 91.34 | [1]79 |
| 6 | 10.06 | 72.43 | 87.62 | [1]69 |
| 7 | 8.37 | 60.26 | 74.66 | [1]67 |
| 8 | 6.93 | 49.90 | 49.97 | 64 |
| 9 | 4.40 | 31.97 | 73.37 | [2]55 |
| 10 | 5.58 | 40.18 | 40.18 | ~65 |
| 11 | 3.61 | 25.99 | 25.99 | 66 |
| 12 | 2.37 | 17.06 | 17.28 | 69 |
| 13 | 1.60 | 11.74 | 11.74 | 82 |
| 14 | 1.35 | 9.72 | 9.72 | 83 |
| 15 | 1.13 | 8.14 | 8.14 | 85 |

[1] Overcharge.
[2] Overcharged with pressure maintained at 5 lbs.

This continued through a 17th discharge with the capacity dropping to 0.7 hour. The total discharge through the 15th cycle was 584.7 meq. Recharging amounted to 739.4 meq. or a 154.7 meq. excess with the cell finishing in a discharged condition. The initial capacity of the cathode was 4828 coulombs/gm.-mix.

contemplates and includes cells and batteries in which it may be desirable to employ in addition the conventional electrode separator materials and depolarizers such as are described hereinabove.

Moreover, while sulfur dioxide is the major depolarizer, the invention does not exclude the presence of minor amounts of insoluble depolarizers such as silver, copper, and nickel halides, metal oxides, and the like, such as disclosed in copending application Ser. No. 669,373.

Moreover, in addition to completely non aqueous systems, the invention is intended to include cells and batteries wherein minor amounts of water are present in the mixture of electrolyte salt and sulfur dioxide solution (and cosolvent if desired) since, in practice it is often difficult to achieve a completely nonaqueous state. The cells and batteries of the invention therefore may be described as being substantially non-aqueous, i.e., as containing no more than the minor amount of water which can be tolerated without harming the anode or other elements of the system.

We claim:

1. An electrochemical cell which comprises in combination an anode of a consumable metal capable of reducing sulfur dioxide, an electron conductive inert cathode and a cathode depolarizer for depolarization of said cathode during cell discharge, and a non-aqueous liquid electrolyte solution containing sulfur dioxide and electrolyte salt substantially inert to sulfur dioxide and to said anode metal, said cathode depolarizer consisting of sulful dioxide in said electrolyte solution.

2. An electrochemical cell defined by claim 1 wherein said anode metal is lithium.

3. An electrochemical cell defined by claim 1 wherein said anode metal is sodium.

4. An electrochemical cell defined by claim 1 wherein said electrolyte salt is lithium halide.

5. An electrochemical cell defined by claim 1 wherein said electrolyte salt is lithium bromide.

6. An electrochemical cell defined by claim 1 wherein said electrolyte salt is lithium perchlorate.

7. An electrochemical cell defined by claim 1 wherein said electrolyte solution also contains an organic liquid cosolvent for said electrolyte salt, said electrolyte solution being substantially a saturated solution of sulfur dioxide at the existing cell pressure.

8. An electrochemical cell defined by claim 7 wherein said organic liquid cosolvent is propylene carbonate.

9. An electrochemical cell defined by claim 7 wherein said organic liquid cosolvent is acetonitrile.

10. An electrochemical cell defined by claim 1 wherein said anode metal is lithium or sodium and said electrolyte salt is an alkali metal salt.

11. An electrochemical cell defined by claim 9 wherein said electron conductive cathode comprises carbon in a state of high surface area.

12. An electrochemical defined by claim 9 wherein said anode metal is lithium, said electron conductive cathode is a porous carbon electrode and said electrolyte salt is lithium perchlorate.

13. An electrochemical cell comprising a consumable lithium anode, a porous electron conductive inert cathode, a cathode depolarizer and contacting said anode and cathode a non-aqueous electrolyte solution which comprises electrolyte salt, sulfur dioxide and organic liquid, the cathode depolarizer for discharge of said cell consisting of sulfur dioxide in said electrolyte solution.

14. An electrochemical cell defined by claim 13 wherein the organic liquid component of said electrolyte solution consists essentially of mixed acetonitrile and propylene carbonate.

15. An electrochemical cell defined by claim 13 wherein said porous cathode consists essentially of porous, high surface area carbon on an electron-conductive supporting substrate.

16. An electrochemical cell defined by claim 14 wherein said porous cathode consists essentially of porous, high surface area carbon on an electron-conductive supporting substrate.

References Cited
UNITED STATES PATENTS

| | | | |
|---|---|---|---|
| 2,874,204 | 2/1959 | Morehouse et al. | 136—137 |
| 3,121,028 | 2/1964 | Story | 136—137 |
| 3,125,467 | 3/1964 | Lawson et al. | 136—83 |
| 3,132,971 | 5/1964 | Selis et al. | 136—100 |
| 3,279,952 | 10/1966 | Minnick | 136—83 |
| 3,393,093 | 7/1968 | Shaw | 136—6 |
| 3,043,896 | 7/1962 | Herbert et al. | 136—6 |
| 3,248,265 | 4/1966 | Herbert | 136—6 |
| 3,423,242 | 1/1969 | Meyers et al. | 136—6 |

ALLEN B. CURTIS, Primary Examiner

A. SKAPARS, Assistant Examiner

U.S. Cl. X.R.

136—83, 100, 154